United States Patent
May et al.

(10) Patent No.: US 12,320,580 B2
(45) Date of Patent: Jun. 3, 2025

(54) REFRIGERATOR APPLIANCE AND METHODS OF ITEM LOCATION IDENTIFICATION

(71) Applicant: Haier US Appliance Solutions, Inc., Wilmington, DE (US)

(72) Inventors: Jason Andrew May, Louisville, KY (US); Brent Alden Junge, Louisville, KY (US); Michael Goodman Schroeder, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 80 days.

(21) Appl. No.: 18/312,161

(22) Filed: May 4, 2023

(65) Prior Publication Data

US 2024/0369291 A1 Nov. 7, 2024

(51) Int. Cl.
| | |
|---|---|
| F25D 29/00 | (2006.01) |
| F25D 23/06 | (2006.01) |
| G06T 7/73 | (2017.01) |
| H04N 5/77 | (2006.01) |
| H04N 23/60 | (2023.01) |
| H04R 1/08 | (2006.01) |

(52) U.S. Cl.
CPC .......... *F25D 29/00* (2013.01); *F25D 23/062* (2013.01); *G06T 7/74* (2017.01); *H04N 5/77* (2013.01); *H04N 23/60* (2023.01); *H04R 1/08* (2013.01)

(58) Field of Classification Search
CPC .... F25D 29/00; F25D 23/062; F25D 2500/06; F25D 2700/06; G06T 7/74; H04N 5/77; H04N 23/60; H04R 1/08
USPC ......................................................... 348/143
See application file for complete search history.

(56) References Cited

U.S. PATENT DOCUMENTS

| | | | |
|---|---|---|---|
| 7,673,464 B2 | 3/2010 | Bodin et al. | |
| 10,292,011 B2 | 5/2019 | Johnson | |
| 10,482,759 B2 | 11/2019 | Sayavong et al. | |
| 11,343,976 B2* | 5/2022 | Hunter | A01G 9/24 |
| 2018/0053140 A1* | 2/2018 | Baca | G01N 33/02 |
| 2020/0097776 A1* | 3/2020 | Kim | G06T 7/70 |

(Continued)

FOREIGN PATENT DOCUMENTS

| | | |
|---|---|---|
| DE | 102016223755 A1 | 5/2018 |
| DE | 102019128604 A1 | 4/2021 |

(Continued)

*Primary Examiner* — Stuart D Bennett
*Assistant Examiner* — Omer Khalid
(74) *Attorney, Agent, or Firm* — Dority & Manning, P.A.

(57) ABSTRACT

A refrigerator appliance may include a cabinet, a door, a camera module, a microphone, and a controller. The cabinet may define a chilled chamber. The door may be rotatably hinged to the cabinet to provide selective access to the chilled chamber. The camera module may be mounted to the cabinet. The microphone may be mounted to the cabinet within the chilled chamber. The controller may be operably coupled to the camera module. The controller may be configured to initiate an operation routine. The operation routine may include initiating a capture sequence at the camera module and the microphone, determining an internal location of a first stored item within the chilled chamber based on a two-dimensional image and a sound recording of the capture sequence, and recording the internal location of the first stored item.

20 Claims, 7 Drawing Sheets

(56) References Cited

U.S. PATENT DOCUMENTS

2021/0089769 A1* 3/2021 Ryu ................ G06V 20/00
2023/0258398 A1* 8/2023 Hu ................ F25D 29/008
340/686.1

FOREIGN PATENT DOCUMENTS

JP 2002316706 A 10/2002
JP 5020302 B2 9/2012

* cited by examiner

REFRIGERATOR APPLIANCE AND METHODS OF ITEM LOCATION IDENTIFICATION

FIELD OF THE INVENTION

The present subject matter relates generally to tracking users of and items within a storage enclosure, such as a refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase excessive or undesired items. For example, certain food items do not readily perish within the chilled chamber, and such food items may be consumed infrequently. Thus, such food items can remain within the chilled chamber for extended periods of time. The users can forget about such food items and purchase replacements despite already having acceptable items. In such a manner, the users can be inconvenienced or expend money needlessly. Additionally or alternatively, some users may be unaware that certain items have been removed or consumed. Thus, users may fail to replace or replenish such items.

Some existing appliances have attempted to address these issues by requiring a user to manually input each item being stored. Other appliances have used various methods, such as scales, to estimate or guess the quantity or identification of items being stored or consumed. Still others have attempted to use pictures to determine certain attributes or location information about items to be stored within an appliance. Nonetheless, such attempts have been insufficiently cumbersome, difficult to assemble, and prone to inaccuracies (e.g., if certain items become hidden or overlap with other items). These drawbacks may be magnified if multiple users interact with a particular appliance.

Accordingly, a refrigerator appliance with features for assisting a user with tracking contents of a chilled chamber of the refrigerator appliance would be useful (e.g., even if certain attributes cannot be accurately determined by sight). Additionally or alternatively, a refrigerator appliance with features for identifying the location of certain contents or items within a chilled chamber would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a camera module, a microphone, and a controller. The cabinet may define a chilled chamber. The door may be rotatably hinged to the cabinet to provide selective access to the chilled chamber. The camera module may be mounted to the cabinet. The microphone may be mounted to the cabinet within the chilled chamber. The controller may be operably coupled to the camera module. The controller may be configured to initiate an operation routine. The operation routine may include initiating a capture sequence at the camera module and the microphone, determining an internal location of a first stored item within the chilled chamber based on a two-dimensional image and a sound recording of the capture sequence, and recording the internal location of the first stored item.

In another exemplary aspect of the present disclosure, a method of operating a refrigerator appliance is provided. The method may include initiating a capture sequence at a camera module and a microphone. The method may also include determining an internal location of a first stored item within a chilled chamber based on a two-dimensional image and a sound recording of the capture sequence. The method may further include recording the internal location of the first stored item.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
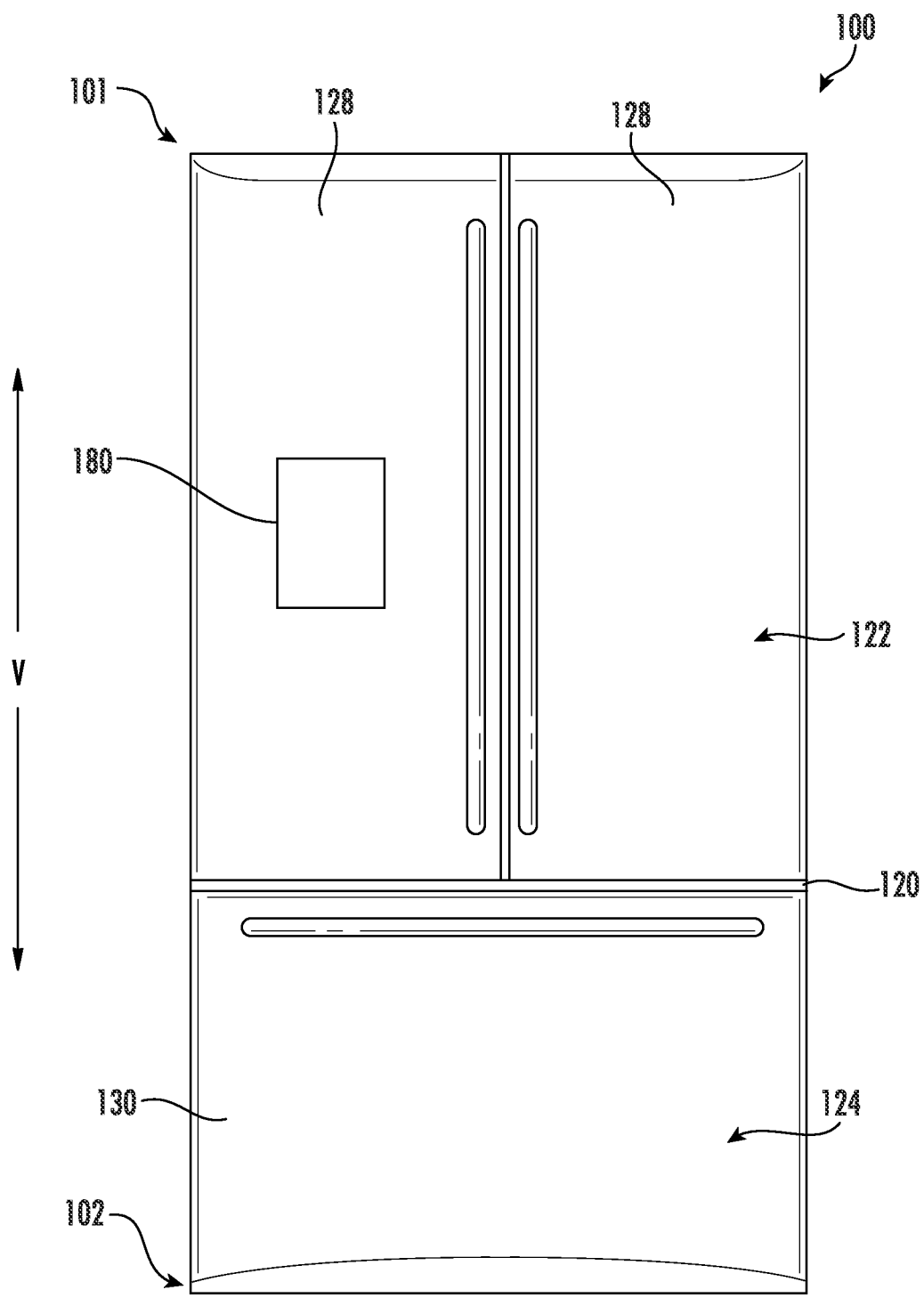
FIG. 1 provides a front elevation view of a refrigerator appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure provides systems and methods to aid in tracking or identifying items (or attributes of the same). The methods may include one or more steps for automatically (e.g., without direct user input) discerning the type of item, the size or mass of the item, or the location of the item. The systems or methods may be able to overcome or compensate for difficulties in various systems or methods in isolation.

Figure 2:
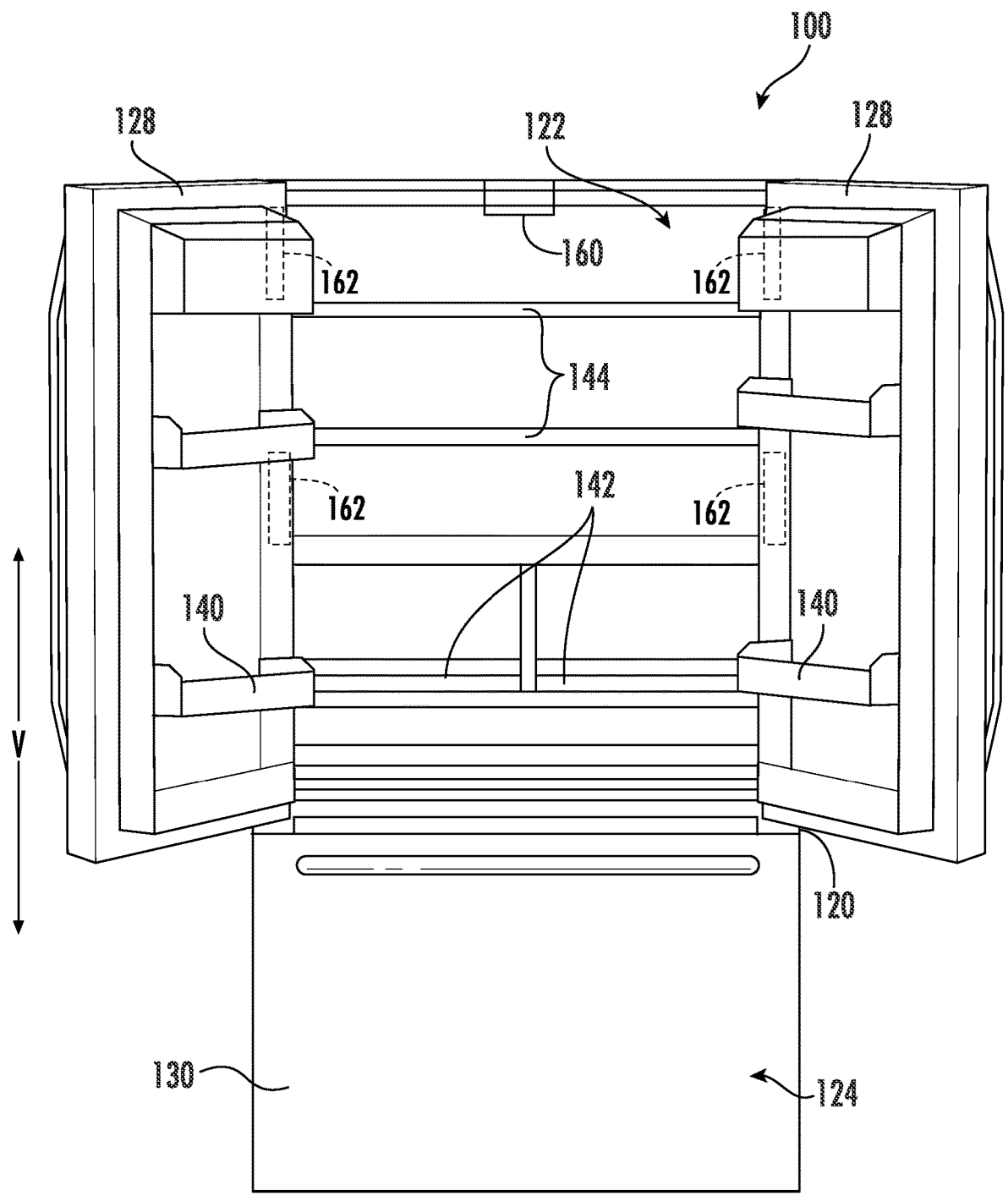
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top 101 and a bottom 102 along a vertical direction V. Cabinet 120 defines chilled chambers for receipt of food items for storage. In particular, cabinet 120 defines fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, or an unrefrigerated pantry enclosure. Consequently, the description set forth herein is for illustrative purposes only and is not intended to be limiting in any aspect to any particular storage enclosure or refrigerator chamber configuration.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

Refrigerator appliance 100 also includes features for assisting a user with identifying food items positioned within fresh food chamber 122 or freezer chamber 124. The user can utilize such features, for example, to view food items stored (i.e., stored items) within fresh food chamber 122 or freezer chamber 124 or create an inventory of such stored items. Such features are discussed in greater detail below.

Figure 3:
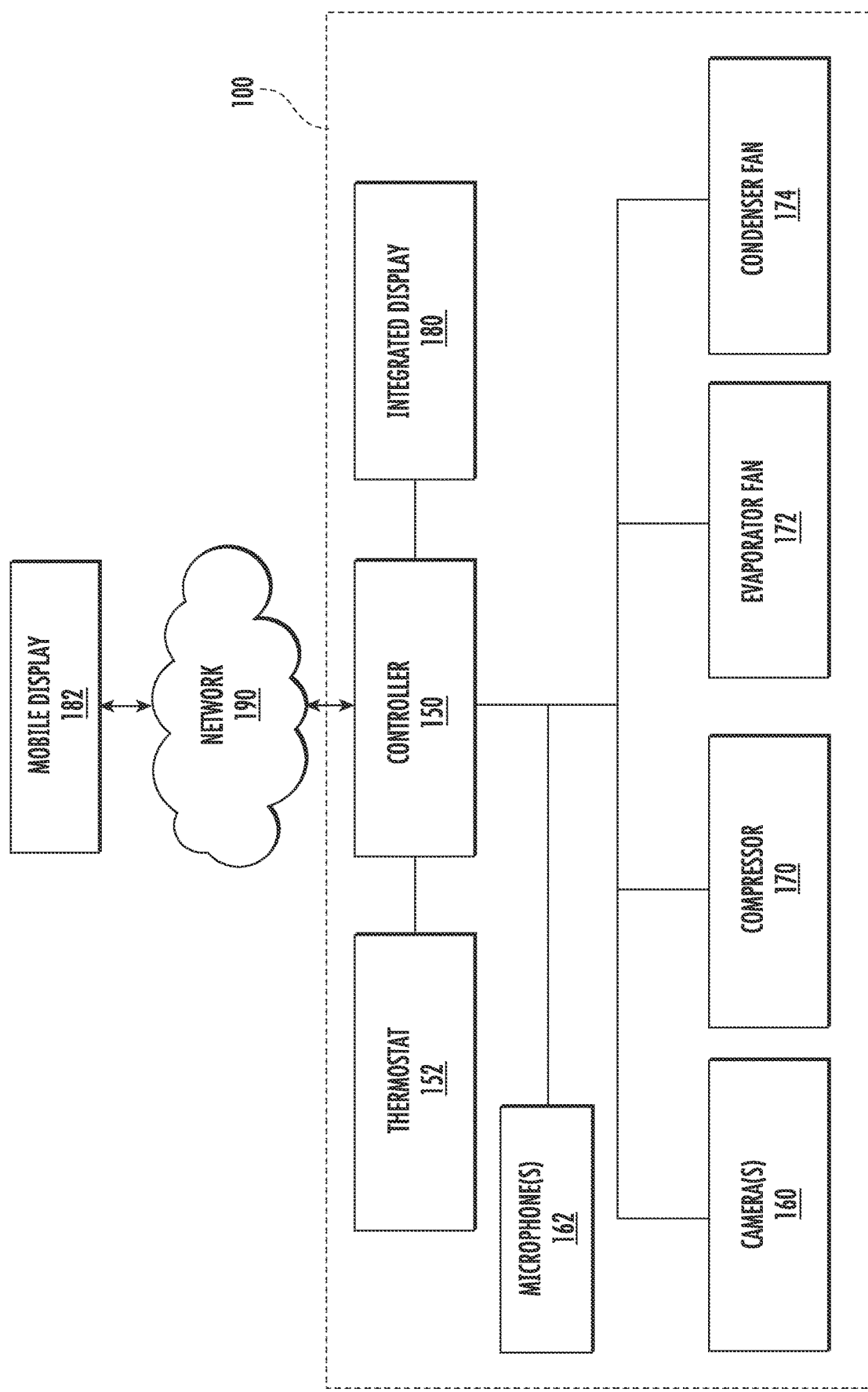
FIG. 3 provides a schematic view of a refrigerator appliance according to exemplary embodiments of the present disclosure.
Figure 4:
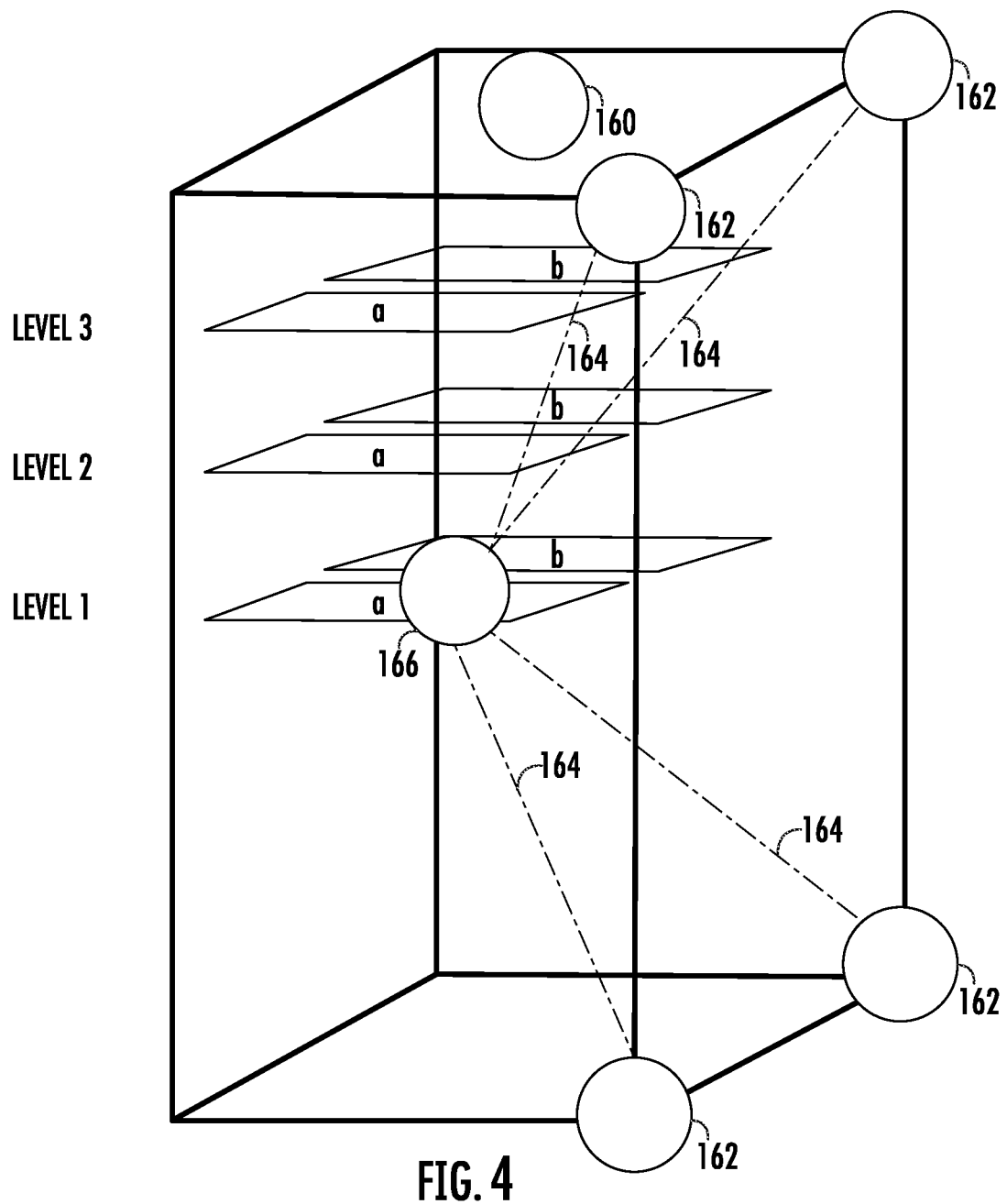
FIG. 4 provides a schematic view of a portion of the cabinet during location detection according to exemplary embodiments of the present disclosure.

Referring now generally to FIGS. 2 through 4, FIG. 3 provides a schematic view of refrigerator appliance 100. FIG. 4 provides another schematic view of fresh food chamber 122 and various components (e.g., camera 160 and microphones 162) therein.

Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory, such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary method 800 described below with reference to FIG. 8). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in operative communication (e.g., electric communication) with controller 150 via one or more conductive signal lines or shared communication busses. Additionally or alternatively, one or more components of refrigerator appliance 100 may be in operative communication (e.g., wireless communication) with controller 150 via one or more wireless signal bands.

Refrigerator appliance 100 also includes a camera or camera module 160. Camera 160 may be any type of device suitable for capturing a two-dimensional picture or image. As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

Generally, camera 160 is positioned within refrigerator appliance 100 and is directed toward one or more chilled chambers (e.g., fresh food chamber 122-FIG. 2). In some embodiments, camera 160 is mounted within fresh food chamber 122 at a top portion thereof (e.g., adjacent top 101). For instance, camera 160 may be fixed to or directed through a top wall of an internal liner defining fresh food chamber 122. In such embodiments, camera 160 may be directed downward, as illustrated in FIG. 2. Additionally or alternatively, a plurality of discrete cameras 160 (e.g., indicated in phantom lines at FIG. 2) may be directed inward towards the fresh food chamber 122 from separate sides or regions of appliance 100 (e.g., a left side of chamber 122, right side of chamber 122, door 128, drawers 142, shelves 144, etc.). Thus, multiple cameras 160 having different fields of view of chamber 122 may be provided within appliance 100.

When assembled, camera(s) 160 may be directed towards at least a portion of any particular one of or combination of drawers 142 and shelves 144 (FIG. 2). Thus, camera 160 can capture images of one of drawers 142, all of drawers 142, one of shelves 144, all of shelves 144, or any suitable combination thereof.

In certain embodiments, refrigerator appliance 100 includes one or more microphones or microphone modules 162. Microphone 162 may be any type of device suitable for capturing sound or audio (i.e., as a sound recording) within the chilled chamber 122 As an example, microphone 162 may include or be provided as a dynamic microphone, ribbon microphone, fiber-optic microphone, piezoelectric microphone. When assembled, microphone 162 is in communication (e.g., electric or wireless communication) with controller 150. As is understood, the microphone 162 may generate one or more electrical signals (e.g., to be received by controller 150) from one or more received soundwaves (e.g., from objects or items within fresh food chamber 122, such as during placement therein).

Generally, microphone 162 is positioned within refrigerator appliance 100 and is directed toward one or more chilled chambers (e.g., fresh food chamber 122-FIG. 2). In some embodiments, one or more microphones 162 are mounted within fresh food chamber 122. For instance, one or more microphones 162 may be mounted at a top portion (e.g., adjacent top 101), bottom portion, right portion, left portion, front portion, or another location (e.g., apart from camera 160).

Optionally, multiple discrete microphones 162 may be mounted at discrete locations apart from each other within fresh food chamber 122. Thus, microphones 162 may be mounted at or to separate sides or regions of appliance 100 (e.g., a left side of chamber 122, right side of chamber 122, door 128, drawers 142, shelves 144, etc.). Moreover, multiple cameras 160 having different pickup-pattern orientations to capture sound from different directions or along different sound vectors 164 (from a stored item 166 within chamber 122) may be provided within appliance 100. In the illustrated embodiments, discrete microphones 162 are mounted at a front left top corner, front right top corner, front left bottom corner, and front left bottom corner of fresh food chamber 122. Nonetheless, any suitable location may be provided for capturing sound within chilled chamber 122. For instance, at least one microphone 162 may be fixed to or directed through a wall of an internal liner defining fresh food chamber 122. In some embodiments, at least one microphone 162 is located at a front half of cabinet 120 (e.g., at or proximal to the front opening). Notably, sounds within the fresh food chamber 122 may be readily distinguished from sounds emanating from outside of the cabinet 120).

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in operative communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

In additional or alternative embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

During use, such as during a capture sequence, one or more cameras 160 may capture one or more two-dimensional images (e.g., as a video feed or series of sequential static images) that may be transmitted to the controller 150 (e.g., as an image data signal), as is generally understood. Additionally or alternatively, one or more microphones 162 may capture one or more sound recordings (e.g., as an audio feed or an isolated audio segment) that may be transmitted to the controller 150 (e.g., as an audio data signal), as is generally understood.

From the captured images, items (e.g., stored items, such as food, or non-stored items such as a user appendage, a shelf, a movable drawer, etc.) within the field of view (e.g., set field of view) for the camera(s) 160 may be automatically identified by the controller 150. As is understood, recognizing or identifying such items, may be performed by edge matching, divide-and-conquer search, greyscale matching, histograms of receptive field responses, or another suitable routine (e.g., executed at the controller 150 based on one or more captured images from one or more cameras 160).

Figure 5:
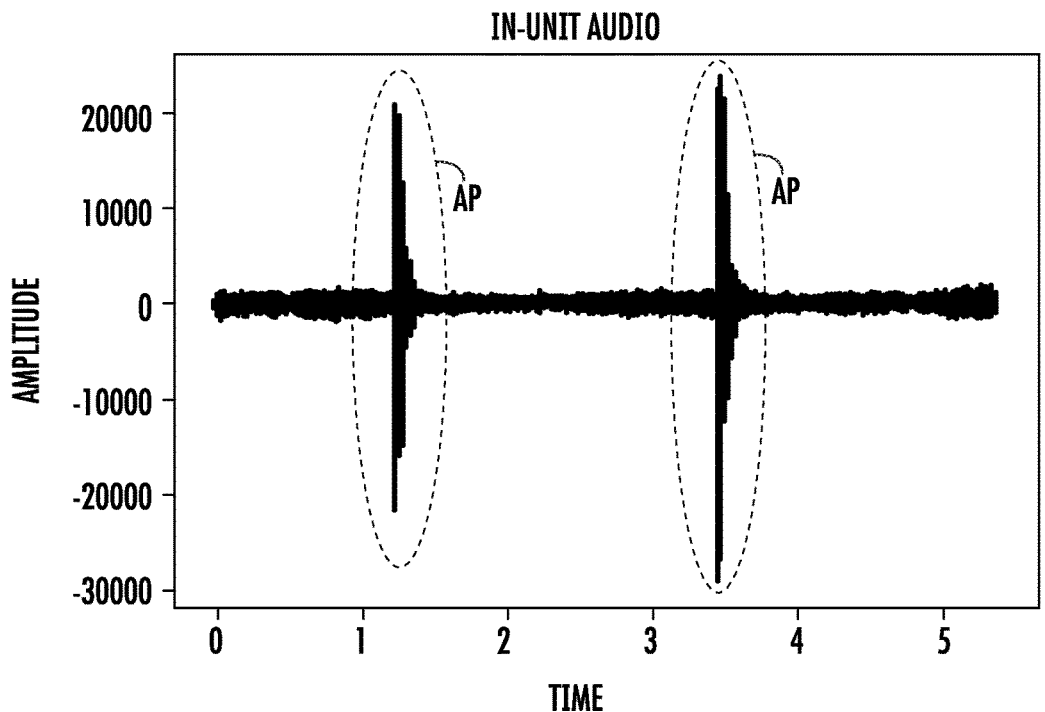
FIG. 5 provides a chart illustrating amplitude relative to time from a sound recording within a chilled chamber according to exemplary embodiments of the present disclosure.
Figure 6:
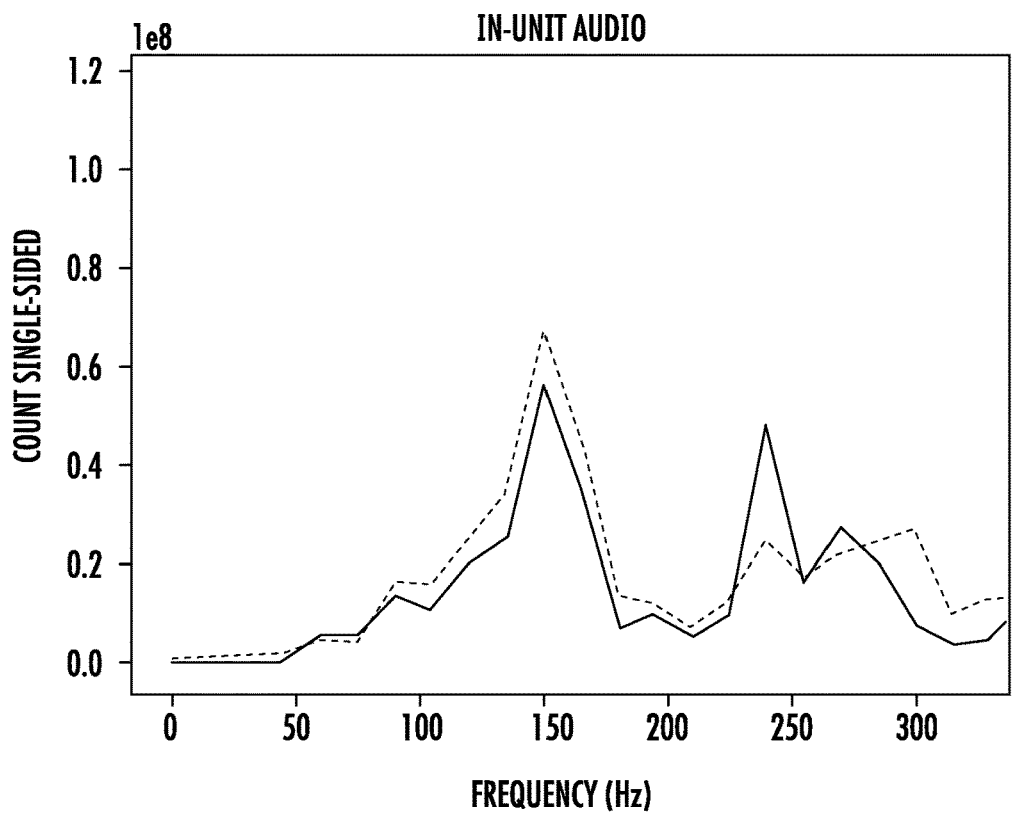
FIG. 6 provides a chart illustrating count relative to frequency from a sound recording within a chilled chamber according to exemplary embodiments of the present disclosure.
Figure 7:
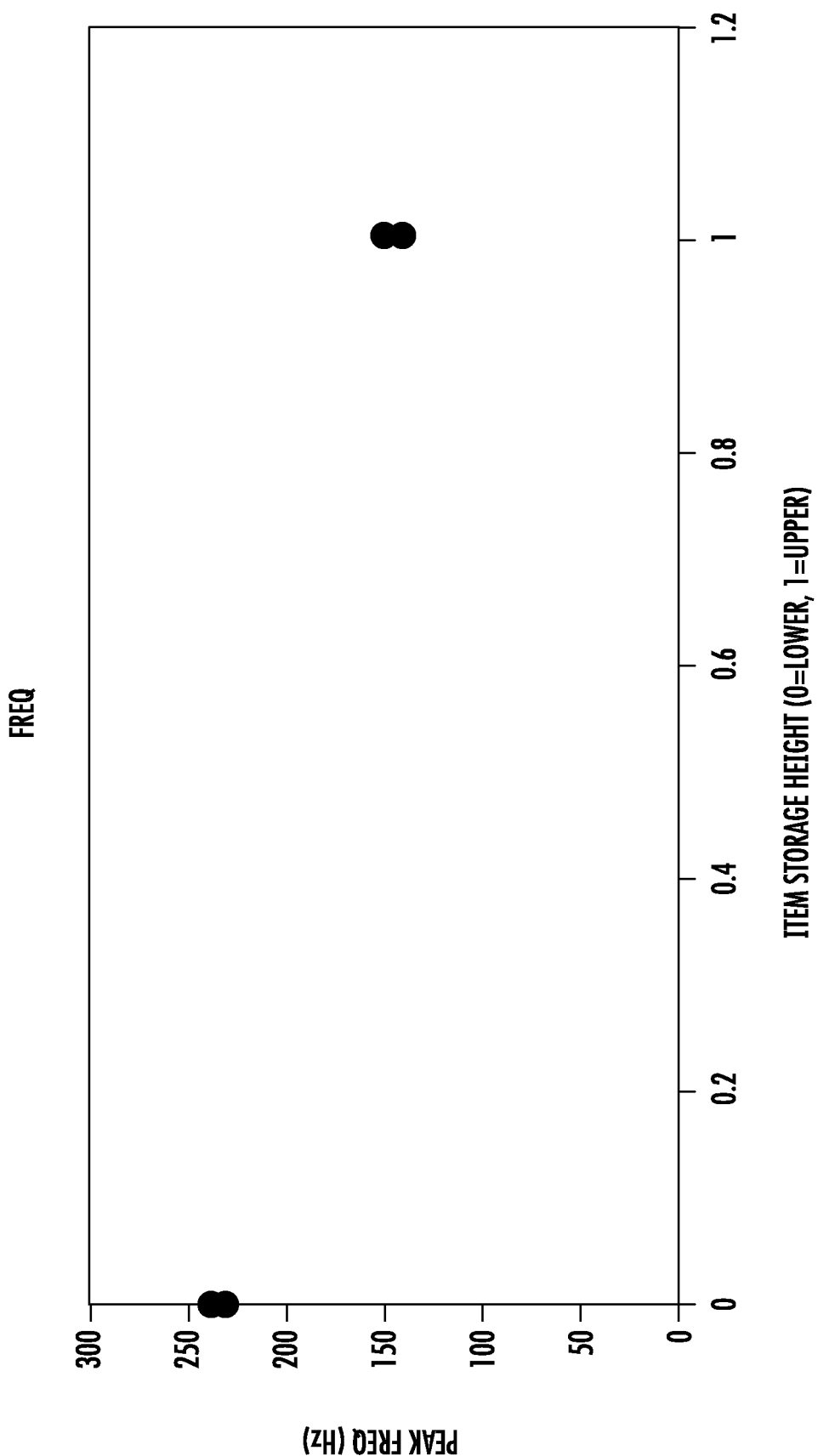
FIG. 7 provides a chart illustrating peak frequency relative to storage height from a sound recording within a chilled chamber according to exemplary embodiments of the present disclosure.

From the captured sound recordings, placement events (e.g., noises generated by moving an item to, from, or within a chilled chamber 122) audible to microphone(s) 162 may be automatically identified by controller. For instance, an amplitude spike or peak AP from the sound recording(s), such as illustrated in FIG. 5, may correspond to or indicate a placement event in which an item is placed in a location within chamber 122 (e.g., on a shelf, drawer, or bin thereof). Optionally, various sound recordings may be synchronized and analyzed (e.g., to determine time of flight for generated sounds to multiple discrete microphones 162). The analyzation of synchronized recordings may indicate specific a specific location for the placement event or the source of the generated sound, as would be understood in light of the present disclosure. Additionally or alternatively, frequency peaks of a placement event may be identified, as illustrated in FIG. 6. Frequency peaks may be empirically linked to an item mass or a location within chamber 122 (e.g., shelf, drawer, or bin; including levels of the same), such as illustrated in FIG. 7. Thus, it may be determined that frequency peaks are specific frequencies or frequency ranges generally correspond to the sound generated when items are placed at certain locations.

Figure 8:
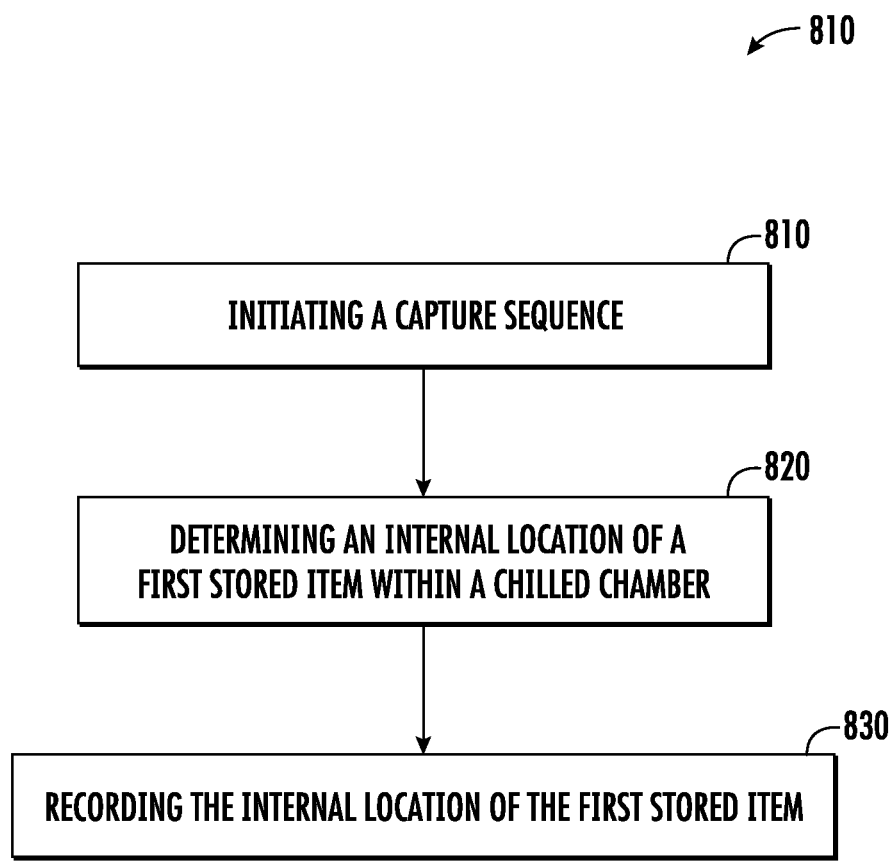
FIG. 8 provides a flow chart illustrating a method of operating a refrigerator appliance according to exemplary embodiments of the present disclosure.

Turning now to FIG. 8, a flow chart is provided of a method 800 according to exemplary embodiments of the present disclosure. Generally, the method 800 provides a method of operating a refrigerator appliance 100 (FIG. 1) that includes one or more microphones 162 or cameras 160, as described above. The method 800 can be performed, for instance, by the controller 150 (FIG. 3). For example, controller 150 may, as discussed, be in communication with microphones 162 or cameras 160. During operations, controller 150 may send signals to and receive signals from microphones 162 or camera 160. Controller 150 may further be in communication with other suitable components of the appliance 100 to facilitate operation of the appliance 100 generally.

Advantageously, methods in accordance with the present disclosure may permit improved detection of one or more items within, for example, a refrigerator appliance (e.g., even if the item is placed in a location obscured from the line of sight of a camera). Additionally or alternatively, attributes of a stored item may be advantageously determined (e.g., without requiring a scale or direct user input). Further additionally or alternatively, the location of a stored item may be reliably and advantageously determined (e.g., without requiring direct user input).

Those of ordinary skill in the art, using the disclosures provided herein, will, in light of the present disclosure, understand that the steps of any of the methods disclosed herein can be modified, adapted, rearranged, omitted, or expanded in various ways without deviating from the scope of the present disclosure (except as otherwise described).

At 610, includes initiating a capture sequence at the camera module or microphone(s).

The capture sequence may include capturing a plurality of two-dimensional images (e.g., a first two-dimensional image, a second two-dimensional image, etc.), such as within a video feed or a series of sequential static images (e.g., taken or captured according to a predetermined rate or condition). Optionally, multiple images (e.g., the first and second images) may be captured at the same camera module or, alternatively, at another camera module (e.g., the first image may be captured at a first camera module, and the second image may be captured at a second camera module). Upon being captured at the camera module, the two-dimensional images may be transmitted to the controller (e.g., as a data signal). The two-dimensional images may then be recorded (e.g., temporarily) for comparison or evaluation.

Additionally or alternatively, the capture sequence may include capturing a sound recording, such as within an audio feed or as one or more isolated audio segments (e.g., having a predetermined duration). Optionally, multiple sound recordings may be captured at discrete microphones within the corresponding chilled chamber (e.g., as described above). Upon being captured at the microphone(s), the one or more sound recordings may then be recorded (e.g., temporarily) for comparison or evaluation (e.g., separate from or in addition to one or more captured two-dimensional images).

In certain embodiments, the capture sequence is initiated in response to detecting movement within a chilled chamber (e.g., fresh food chamber) of the refrigerator appliance. Thus, recording or evaluating two-dimensional images from the camera module or sound recordings from the microphones may be prevented until movement is detected. As an example, movement may be detected at the camera module directed at the chilled chamber. Specifically, changes in light or pixels captured by the camera module may be detected (e.g., between multiple images captured over time) indicating the movement of one or more objects within the field of view of the camera module, as is generally understood. As another example, movement may be detected in response to receiving a signal from a separate sensor, such as a switch selectively engaged with the door. Such switches are generally understood and may, for instance, simultaneously control activation of a light for illuminating the chilled chamber. Opening the refrigerator door may thus activate the light and transmit a signal indicating motion within the chilled chamber.

Optionally, the capture sequence may continue until one or more end conditions are met. As an example, an end condition may include expiration of a predetermined time period (e.g., span of time) following the start of a corresponding detection of movement. As another example, an end condition may include failure to detect further changes in sequential images of the capture sequence. In other words, the capture sequence may end after sequential images stop changing or detecting further movement. The end condition may specifically require a preset number or time period of unchanged sequential images. As yet another example, an end condition may include detecting closure of the door to the chilled chamber. In other words, the capture sequence may end in response to the door being moved to the closed position.

In optional embodiments, the method 800 includes one or more steps of identifying an item within the chilled chamber (e.g., a first stored item), such as based on a two-dimensional image of the capture sequence. In other words, using at least one two-dimensional image of the two-dimensional images captured at 810, a first stored item (e.g., food item) may be recognized (e.g., via one or more machine learning or artificial intelligence routines). The identification may thus require the first stored item to pass beneath or within the field of view of the camera module. Thus, the first two-dimensional image may include at least a captured portion of the first stored item. Moreover, once captured, recognizing or identifying the first stored item may be performed by edge matching, divide-and-conquer search, greyscale matching, histograms of receptive field responses, or another suitable routine.

At 820, the method 800 includes determining an internal location of the first stored item within the chilled chamber. For instance, the internal location may include or be provided as a specific shelf, bin, or drawer within the chilled chamber. Additionally or alternatively, the internal location may include or be provided as a relative region; such as a level of height (e.g., first level, second level, or third level), lateral orientation (e.g., right half or left half of the chilled chamber), or transverse orientation (e.g., forward half or rearward half of the chilled chamber). In some embodiments, the determined internal location based on at least one two-dimensional image and a sound recording of the capture sequence.

With respect to the two-dimensional images, 820 may include evaluating one or more images captured at 810. For instance, the internal location of the first stored item may be based, at least in part, on a second two-dimensional image of the capture sequence that is captured subsequent to the first two-dimensional image (e.g., in which the first item is identified). Optionally, determination of the internal location at 820 may include identifying a user appendage within a two-dimensional image of the capture sequence. For instance, a user appendage may be a hand or arm. Moreover, the user appendage may be identified as extending from or in contact with the first stored item. Once the user appendage is identified, 820 may include determining the user appendage crosses a preset fiducial reference or edge (e.g., predetermined fixed reference point or edge of a shelf or drawer below and blocked by the user appendage) within the chilled chamber. Crossing one or more preset fiducial references or edges may correspond to or indicate one or more regions or levels within the chilled chamber, as would be understood in light of the present disclosure.

In additional or alternative embodiments, the internal location includes a particular drawer movably mounted within the chilled chamber. Determination of the internal location at 820 may include identifying an opened state of a drawer based on one or more two-dimensional images of the capture sequence. For instance, as would be understood in light of the present disclosure, the drawer may be detected within a predetermined bounding zone within the field of view of the camera. Once the drawer is determined to be in the opened state, 820 may include detecting the first stored item within a predetermined bounding zone. Optionally, the internal location may include a specific layer (e.g., first vertical layer) within the drawer or chilled chamber generally (e.g., in instances in which multiple items are stacked on top of each other).

In still further additional or alternative embodiments, 820 includes determining a visual location score (e.g., of the first stored item) based on one or more of the two-dimensional images. The visual location score may provide a probability value (e.g., as a percentage) corresponding to the likelihood that first stored item is located at a particular internal location using one or more two-dimensional images from 810. In other words, the visual location score may indicate the level of confidence that the first item is disposed at the particular internal location. To this end, an empirically derived formula or algorithm to evaluate the two-dimensional images (e.g., as described above with respect to visual determinations of the internal location) and assign a visual recognition score based on the evaluation. Optionally, multiple discrete scores corresponding to the first item may be determined—each score corresponding to a different recognizable location. For an illustrative example, a visual location score of 90% for a Level 1 may be assigned to indicate that there is a 90% probability that the first stored item is at a predetermined Level 1, a visual score of 30% for a Level 2 may be assigned to indicate that there is a 30% probability that the first stored item is at a predetermined Level 2, etc. Optionally, the multiple location scores may be compared, and the higher score may be selected or used for further steps, as described below.

With respect to the sound recordings, 820 may include evaluating one or more of the sound recordings captured at 810. In some embodiments, 820 includes evaluating amplitude characteristics of the sound recordings. Specifically, amplitude or volume levels captured in the sound recordings may be evaluated such that the determined internal location is based on one or more amplitude characteristics. As an example, 820 may include identifying a placement event of a stored item (e.g., first stored item) based on one or more amplitude characteristics. To that end, one or more amplitude peaks may be measured in a sound recording (e.g., as amplitude measurements above a set amplitude threshold or a relative threshold, or otherwise within a set amplitude range). Such amplitude peaks may correspond to a significant noise generated when an item (e.g., first stored item) is placed down or moved within the chilled chamber. As a result, measuring an amplitude threshold may, at least in part, indicate a placement event.

Sound recordings from the microphones may be used to triangulate or otherwise determine the location from which a sound emanates (e.g., during a placement of a stored item). In certain embodiments, multiple sound recordings are captured from multiple discrete microphones (e.g., mounted at different locations), as described above. In some such embodiments, the multiple sound recordings may be synchronized such that the placement event (e.g., as indicated by the amplitude peaks) or the point in time corresponding to the placement event is identified in each sound recording. Subsequently, 820 may include determining latency of the placement event between the plurality of sound recordings. Based on the determined latency, an internal location may be determined (e.g., using time of flight calculations or sound-travel triangulation, as would be understood in light of the present disclosure). Optionally, a geometric threshold may be adopted in which sounds identified as originating outside of the chilled chamber (i.e., having a determined location outside of the chilled chamber) are disregarded or otherwise ignored.

Separate from or in addition to the amplitude characteristics, the determined internal location may be based on a frequency characteristic of one or more of the sound recordings. For instance, prior to 810, it may be determined that noise is generated at specific frequencies (e.g., frequency values or range of values) in response to objects being placed on certain support items (e.g., shelves, bins, drawers, etc.). Thus, multiple support items may be correlated to discrete frequencies, and such correlations may be stored (e.g., within the controller as a table, chart, graph, or formula). Moreover, at 820, frequency characteristics of the sound recordings may be measured and compared (e.g., to the stored frequency correlations). Based on the comparison, an internal location may be determined. Optionally, one or more frequency filters may be applied in order to disregard sounds having frequencies outside of one or more predetermined filter bands, as would be understood.

In certain embodiments, 820 includes determining an audio location score (e.g., of the first stored item) based on one or more of the sound recordings (e.g., as a set calculation). In some embodiments, the audio location score provides a coordinate value for the location of the first stored item within the chilled chamber that is calculated or selected using the one or more sound recordings. Optionally, the audio location score may provide a probability value (e.g., as a percentage) corresponding to the likelihood that first stored item is located at a particular internal location using one or more sound recordings from 810 (e.g., independently or separately from any visual location score). In other words, the audio location score may indicate the level of confidence that the first item is disposed at the particular internal location. To this end, an empirically derived formula or algorithm to evaluate the sound recordings (e.g., at or from a determined placement event, or otherwise as described above with respect to audio determinations of the internal location) and assign an audio recognition score based on the evaluation. Optionally, multiple discrete scores to the first item—each recognition score corresponding to a different recognizable location. For an illustrative example, an audio location score of 90% for a Level 1 may be assigned to indicate that there is a 90% probability that the first stored item is at a predetermined Level 1, an audio location score of 30% for a Level 2 may be assigned to indicate that there is a 30% probability that the first stored item is at a predetermined Level 2, etc. Optionally, the multiple location scores may be compared, and the higher score may be selected or used for further steps, as described below.

In embodiments in which both a visual location score and an audio location score are determined, 820 may further include reconciling the determined visual location score with the determined audio location score to provide the internal location from or based on a reconciled score. For instance, both visual and audio location scores may be used an inputs or variables for an output or resultant reconciled score. In particular, a predetermined table, chart, graph, or formula stored within the controller may be provided for reconciling the location scores. In an exemplary form, the reconciled score may be calculated as a mean value (e.g., weighted or unweighted average) of the visual location score and the audio location score. Alternatively, however, any other suitable formula may be provided for calculating a reconciled score. Optionally, either the visual location score or the audio location score may be given greater weight, preference, or dominance for the reconciled score based on one or more other determinations, as will be described in greater detail below.

Prior to calculating a reconciled score, 820 may include matching the identified first stored item with the identified placement event. For instance, the identification of the first stored item may be detected as within a set time interval from the identified placement event. In other words, the time of capture of the image from which the first stored item is identified may be determined to be within a set time interval (e.g., prior to) the time at which the identified placement event occurs. Thus, the timing of the captured image(s) or sound recording(s) may be compared. Such timing may be included with the captured images or sound recordings, or may be separately determined, as would be understood.

In some embodiments, timing comparisons may affect or influence determination of the reconciled location.

As an example, timing of one or more images compared to each other may affect the reconciliation. In some such embodiments, 820 includes comparing timing of the first and second two-dimensional images with each other or the placement event of the sound recording. For instance, comparing may further include determining the first two-dimensional image precedes the placement event and determining the second two-dimensional image succeeds or accompanies the placement event. Thus, the first image (e.g., from which a first visual score is determined) may capture a moment before that of the second image (e.g., from which a second visual location score is determined). Moreover, the second image may be determined to succeed the first two-dimensional image (e.g., occur after the first two-dimensional image within a set period of time from the placement event). Subsequently (e.g., in response to determining the visual location score is below the set score threshold), 820 may include assigning greater weight to the second visual location score than the first visual location score in reconciliation based on the compared timing. Assigning greater weight may include, for instance, applying a higher weight coefficient to the second visual location score than a weight coefficient applied to the first visual location score in the formula of the reconciliation (e.g., in a weighted mean formula, or another suitable formula). Optionally, the first visual location score may be disregarded or deleted in calculating the reconciliation (e.g., reconciled location score).

As an additional or alternative example, timing of one or more images compared to the sound recordings may affect the reconciliation. In some such embodiments, 820 includes comparing timing of the first and second two-dimensional images with the placement event of the sound recording. For instance, comparing may further include determining the first two-dimensional image precedes the placement event and determining the second two-dimensional image succeeds or accompanies the placement event. Thus, the first image (e.g., in which a stored item is identified) may capture a moment before that of the second image (e.g., from which a visual location score is determined). Moreover, the second image may be determined to succeed or accompany the placement (e.g., occur within a set period of time from the placement event). In some such embodiments, a visual location score is determined based on the second image, but the determined visual location score is also determined to fall below a set score threshold (e.g., because the first stored item is obscured within the second image). Subsequently (e.g., in response to determining the visual location score is below the set score threshold), 820 may include assigning greater weight to the audio location score than the visual location score in reconciliation based on the compared timing. Assigning greater weight may include, for instance, applying a higher weight coefficient to the audio location score than a weight coefficient applied to the visual location score in the formula of the reconciliation (e.g., in a weighted mean formula, or another suitable formula).

In optional embodiments, the method 800 further includes determining a mass attribute of the first stored item based on one or more of the sound recordings at 810. For instance, prior to 810, it may be determined that noise is generated at specific frequencies (e.g., frequency values or range of values) according to the mass of a specific object (e.g., identified item). Thus, multiple mass values of one or more specific objects may be correlated to discrete frequencies, and such correlations may be stored (e.g., within the controller as a table, chart, graph, or formula). Moreover, following 810, frequency characteristics of the sound recordings may be measured and compared (e.g., to the stored frequency correlations). Based on the comparison, a mass attribute (e.g., specific mass value or relative mass level) of a stored item may be determined.

At 830, the method 800 includes recording the internal location of the first stored item from 820. Notably, an accurate location of the stored item may be recorded and, thus, tracked (e.g., to be communicated to or displayed for a user). Optionally, a descriptor of the stored item and the internal location thereof may be stored to the inventory. Additionally or alternatively, the determined mass attribute of the stored item may be stored to the inventory. Thus, the controller may provide a descriptor, mass attribute, or internal location of the first stored item. As described above, the descriptor may include text or an image. In optional embodiments, the descriptor of the first stored item includes at least a portion of a two-dimensional image of the capture sequence. In alternative embodiments, the descriptor of the stored item includes a received two-dimensional image captured separately from the refrigerator appliance (e.g., downloaded to the controller from a remote server). Thus, if the stored item would be difficult for a user to visually distinguish in one or more of the two-dimensional images, a separate image (e.g., preloaded image) may be presented of a substantially identical item.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance comprising a camera module and a microphone within a chilled chamber defined by a cabinet, the method comprising:
    initiating a capture sequence at the camera module and the microphone;
    determining an internal location of a first stored item within the chilled chamber based on a two-dimensional image and a sound recording of the capture sequence; and
    recording the internal location of the first stored item,
    wherein determining the internal location comprises
    determining a visual location score of the first stored item based on the two-dimensional image,
    determining an audio location score of the first stored item based on the sound recording, and
    reconciling the determined visual location score with the determined audio location score,
    wherein determining the internal location comprises
        determining a visual location score of the first stored item based on the two-dimensional image,
        determining an audio location score of the first stored item based on the sound recording, and
        reconciling the determined visual location score with the determined audio location score.

2. The method of claim 1, wherein the determined internal location is based on an amplitude characteristic of the sound recording.

3. The method of claim 1, wherein the determined internal location is based on a frequency characteristic of the sound recording.

4. The method of claim 1, further comprising:
    determining a mass attribute of the first stored item based on the sound recording; and
    recording the mass attribute of the first stored item,
    wherein the determined mass attribute is based on a frequency characteristic of the sound recording.

5. The method of claim 1, wherein the microphone comprises a plurality of microphones spaced apart within the chilled chamber,
    wherein the sound recording comprises a plurality of sound recordings each corresponding to a discrete microphone of the plurality of microphones,
    wherein determining the internal location comprises identifying a placement event of the first stored item within the plurality of sound recordings and determining latency of the placement event between the plurality of sound recordings, and
    wherein the determined internal location is based on the determined latency.

6. The method of claim 1, wherein determining the visual location score comprises identifying the first stored item within the two-dimensional image, wherein determining the audio location score comprises identifying a placement event of the first stored item within the sound recording, and wherein reconciling the determined visual location score with the determined audio location score comprises matching the identified first stored item with the identified placement event.

7. The method of claim 1, wherein the two-dimensional image comprises a first two-dimensional image and a second two-dimensional image captured subsequently to the first two-dimensional image during the capture sequence, wherein determining the visual location score comprises determining a first visual location score based on the first two-dimensional image and determining a second visual location score based on the second two-dimensional image, wherein determining the audio location score comprises identifying a placement event of the first stored item within the sound recording, and wherein reconciling the determined visual location score with the determined audio location score comprises comparing timing of the first and second two-dimensional images with the placement event, comparing comprising determining the first two-dimensional image precedes the placement event and determining the second two-dimensional image succeeds the first two-dimensional image, and assigning greater weight to the second visual location score than the first visual location score in reconciliation based on the compared timing.

8. The method of claim 1, wherein determining the audio location score comprises identifying a placement event of the first stored item within the sound recording, wherein the two-dimensional image comprises a first two-dimensional image and a second two-dimensional image captured subsequently to the first two-dimensional image during the capture sequence, and wherein determining the visual location score comprises determining a first visual location score based on the first two-dimensional image and determining a second visual location score based on the second two-dimensional image, the second visual location score being below a set score threshold, comparing timing of the first and second two-dimensional images with the placement event, comparing comprising determining the first two-dimensional image precedes the placement event and determining the second two-dimensional image succeeds or accompanies the placement event, and assigning greater weight to the audio location score than the second visual location score in reconciliation based on the compared timing.

9. A method of operating a refrigerator appliance comprising a camera module and a microphone within a chilled chamber defined by a cabinet, the method comprising:

initiating a capture sequence at the camera module and the microphone;

determining an internal location of a first stored item within the chilled chamber based on a two-dimensional image and a sound recording of the capture sequence; and recording the internal location of the first stored item, wherein the determined internal location is based on an amplitude characteristic of the sound recording.

10. The method of claim 9, further comprising:

determining a mass attribute of the first stored item based on the sound recording; and recording the mass attribute of the first stored item, wherein the determined mass attribute is based on a frequency characteristic of the sound recording.

11. The method of claim 9, wherein the microphone comprises a plurality of microphones spaced apart within the chilled chamber, wherein the sound recording comprises a plurality of sound recordings each correspond to a discrete microphone of the plurality of microphones, wherein determining the internal location comprises identifying a placement event of the first stored item within the plurality of sound recordings and determining latency of the placement event between the plurality of sound recordings, and wherein the determined internal location is based on the determined latency.

12. The method of claim 9, wherein determining the internal location comprises determining a visual location score of the first stored item based on the two-dimensional image, determining an audio location score of the first stored item based on the sound recording, and reconciling the determined visual location score with the determined audio location score, wherein determining the visual location score comprises identifying the first stored item within the two-dimensional image, wherein determining the audio location score comprises identifying a placement event of the first stored item within the sound recording, and wherein reconciling the determined visual location score with the determined audio location score comprises matching the identified first stored item with the identified placement event.

13. The method of claim 9, wherein determining the internal location comprises determining a visual location score of the first stored item based on the two-dimensional image, determining an audio location score of the first stored item based on the sound recording, and reconciling the determined visual location score with the determined audio location score, wherein the two-dimensional image comprises a first two-dimensional image and a second two-dimensional image captured subsequently to the first two-dimensional image during the capture sequence, wherein determining the visual location score comprises determining a first visual location score based on the first two-dimensional image and determining a second visual location score based on the second two-dimensional image, wherein determining the audio location score comprises identifying a placement event of the first stored item within the sound recording, and wherein reconciling the determined visual location score with the determined audio location score comprises comparing timing of the first and second two-dimensional images with the placement event, comparing comprising determining the first two-dimensional image precedes the placement event and determining the second two-dimensional image succeeds the first two-dimensional image, and assigning greater weight to the second visual location score than the first visual location score in reconciliation based on the compared timing.

14. The method of claim 9, wherein determining the internal location comprises determining a visual location score of the first stored item based on the two-dimensional image,
determining an audio location score of the first stored item based on the sound recording, and
reconciling the determined visual location score with the determined audio location score,
wherein determining the audio location score comprises identifying a placement event of the first stored item within the sound recording,
wherein the two-dimensional image comprises a first two-dimensional image and a second two-dimensional image captured subsequently to the first two-dimensional image during the capture sequence, and
wherein determining the visual location score comprises determining a first visual location score based on the first two-dimensional image and determining a second visual location score based on the second two-dimensional image, the second visual location score being below a set score threshold,
comparing timing of the first and second two-dimensional images with the placement event, comparing comprising determining the first two-dimensional image precedes the placement event and determining the second two-dimensional image succeeds or accompanies the placement event, and
assigning greater weight to the audio location score than the second visual location score in reconciliation based on the compared timing.

15. A method of operating a refrigerator appliance comprising a camera module and a microphone within a chilled chamber defined by a cabinet, the method comprising:
initiating a capture sequence at the camera module and the microphone;
determining an internal location of a first stored item within the chilled chamber based on a two-dimensional image and a sound recording of the capture sequence; and
recording the internal location of the first stored item,
wherein the microphone comprises a plurality of microphones spaced apart within the chilled chamber,
wherein the sound recording comprises a plurality of sound recordings each corresponding to a discrete microphone of the plurality of microphones,
wherein determining the internal location comprises identifying a placement event of the first stored item within the plurality of sound recordings and determining latency of the placement event between the plurality of sound recordings, and
wherein the determined internal location is based on the determined latency.

16. The method of claim 15, wherein the determined internal location is based on a frequency characteristic of the sound recording.

17. The method of claim 15, further comprising:
determining a mass attribute of the first stored item based on the sound recording; and
recording the mass attribute of the first stored item,
wherein the determined mass attribute is based on a frequency characteristic of the sound recording.

18. The method of claim 15, wherein determining the internal location comprises
determining a visual location score of the first stored item based on the two-dimensional image,
determining an audio location score of the first stored item based on the sound recording, and
reconciling the determined visual location score with the determined audio location score,
wherein determining the visual location score comprises identifying the first stored item within the two-dimensional image,
wherein determining the audio location score comprises identifying a placement event of the first stored item within the sound recording, and
wherein reconciling the determined visual location score with the determined audio location score comprises matching the identified first stored item with the identified placement event.

19. The method of claim 15, wherein determining the internal location comprises
determining a visual location score of the first stored item based on the two-dimensional image,
determining an audio location score of the first stored item based on the sound recording, and
reconciling the determined visual location score with the determined audio location score,
wherein the two-dimensional image comprises a first two-dimensional image and a second two-dimensional image captured subsequently to the first two-dimensional image during the capture sequence,
wherein determining the visual location score comprises determining a first visual location score based on the first two-dimensional image and determining a second visual location score based on the second two-dimensional image,
wherein determining the audio location score comprises identifying a placement event of the first stored item within the sound recording, and
wherein reconciling the determined visual location score with the determined audio location score comprises
comparing timing of the first and second two-dimensional images with the placement event, comparing comprising determining the first two-dimensional image precedes the placement event and determining the second two-dimensional image succeeds the first two-dimensional image, and
assigning greater weight to the second visual location score than the first visual location score in reconciliation based on the compared timing.

20. The method of claim 15, wherein determining the internal location comprises
determining a visual location score of the first stored item based on the two-dimensional image,
determining an audio location score of the first stored item based on the sound recording, and
reconciling the determined visual location score with the determined audio location score,
wherein determining the audio location score comprises identifying a placement event of the first stored item within the sound recording,
wherein the two-dimensional image comprises a first two-dimensional image and a second two-dimensional image captured subsequently to the first two-dimensional image during the capture sequence, and
wherein determining the visual location score comprises determining a first visual location score based on the first two-dimensional image and determining a second visual location score based on the second two-dimensional image, the second visual location score being below a set score threshold,
comparing timing of the first and second two-dimensional images with the placement event, comparing comprising determining the first two-dimensional image precedes the placement event and determining the second two-dimensional image succeeds or accompanies the placement event, and assigning greater weight to the audio location score than the second visual location score in reconciliation based on the compared timing.

* * * * *